(12) United States Patent
Shipley et al.

(10) Patent No.: US 11,358,502 B2
(45) Date of Patent: Jun. 14, 2022

(54) SEATING ASSEMBLY WITH VENTILATION

(71) Applicant: Ford Global Technologies, LLC, Dearborn, MI (US)

(72) Inventors: Robert Charles Shipley, Plymouth, MI (US); Steven Walter Nunez, South Lyon, MI (US); Timothy Owen Hamlin, Warren, MI (US); Lucian Vacarescu, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 16/792,732

(22) Filed: Feb. 17, 2020

(65) Prior Publication Data

US 2021/0253002 A1   Aug. 19, 2021

(51) Int. Cl.
| | | |
|---|---|---|
| *B60N 2/56* | (2006.01) | |
| *B29C 44/12* | (2006.01) | |
| *B29C 44/42* | (2006.01) | |
| *B29K 75/00* | (2006.01) | |
| *B29K 623/00* | (2006.01) | |
| *B29K 625/00* | (2006.01) | |
| *B29L 31/00* | (2006.01) | |

(52) U.S. Cl.
CPC ........ *B60N 2/5642* (2013.01); *B29C 44/1233* (2013.01); *B29C 44/428* (2013.01); *B60N 2/5657* (2013.01); *B29K 2075/00* (2013.01); *B29K 2623/12* (2013.01); *B29K 2625/06* (2013.01); *B29L 2031/771* (2013.01)

(58) Field of Classification Search
CPC .. B60N 2/5642; B60N 2/5657; B60N 2/5621; B60N 2/56; B29C 44/1233; B29C 44/428; B29K 2075/00; B29K 2623/12; B29K 2625/06; B29L 2031/771
USPC ...................................................... 297/180.14
See application file for complete search history.

(56) References Cited

U.S. PATENT DOCUMENTS

| | | | |
|---|---|---|---|
| 6,291,803 B1 * | 9/2001 | Fourrey | B60N 2/58 |
| | | | 219/202 |
| 7,607,739 B2 | 10/2009 | Browne et al. | |
| 10,363,845 B2 * | 7/2019 | Dry | C09J 7/22 |
| 2006/0175877 A1 * | 8/2006 | Alionte | B60N 2/5657 |
| | | | 297/180.14 |
| 2007/0040421 A1 * | 2/2007 | Zuzga | B60N 2/5657 |
| | | | 297/180.13 |
| 2007/0176471 A1 * | 8/2007 | Knoll | B60N 2/5685 |
| | | | 297/180.14 |
| 2009/0066142 A1 | 3/2009 | Ventura et al. | |
| 2010/0300644 A1 * | 12/2010 | Chung | B60N 2/5657 |
| | | | 165/41 |

(Continued)

FOREIGN PATENT DOCUMENTS

| | | |
|---|---|---|
| DE | 102006061226 A1 | 6/2008 |
| JP | 2018000263 A | 1/2018 |

*Primary Examiner* — Mark R Wendell
(74) *Attorney, Agent, or Firm* — Vichit Chea; Price Heneveld LLP (57) ABSTRACT

A vehicle seating assembly includes a first part, a second part with a second foam part, and a barrier with a permeable portion and a non-permeable portion. The vehicle seating assembly also includes an air passageway extending through the first part, the second foam part, and the permeable portion of the barrier and an air mover fluidly coupled to the air passageway for moving air through the air passageway.

14 Claims, 10 Drawing Sheets

(56) References Cited

U.S. PATENT DOCUMENTS

| | | | |
|---|---|---|---|
| 2013/0264742 A1* | 10/2013 | Ota | B60N 2/5657 |
| | | | 264/266 |
| 2016/0288678 A1* | 10/2016 | Berry | B60N 2/5642 |
| 2019/0061573 A1* | 2/2019 | Dry | B60N 2/5635 |
| 2020/0180479 A1* | 6/2020 | Russman | B60N 2/5657 |

* cited by examiner

SEATING ASSEMBLY WITH VENTILATION

FIELD OF THE DISCLOSURE

The present disclosure generally relates to a vehicle seating assembly with an air passageway for ventilation.

BACKGROUND OF THE DISCLOSURE

A vehicle seating assembly may include an air mover and an air passageway for delivering air to or pulling air from a seating surface. The vehicle seating assembly may include a molded cushion assembly having an air passageway.

SUMMARY OF THE DISCLOSURE

According to one aspect of the present disclosure, a vehicle seating assembly includes a first part, a second foam part, and a barrier with a permeable portion and a non-permeable portion. The vehicle seating assembly also includes an air passageway extending through the first part, the second foam part, and the permeable portion of the barrier and an air mover fluidly coupled to the air passageway for moving air through the air passageway.

Embodiments of the first aspect of the disclosure can include any one or a combination of the following features:
- an air passageway portion disposed through the first part, an air passageway portion disposed through the barrier and defined by the permeable portion of the barrier, and an air passageway portion disposed through the second foam part;
- the first part includes a first foam part;
- the first part includes one or more of a molded plastic, an expanded polypropylene (EPP) and a polystyrene;
- the first part includes a base part, and the second foam part includes a seating support part;
- the barrier includes a film with a permeable portion and a non-permeable portion;
- the barrier includes a non-woven cloth including a permeable portion and a non-permeable portion;
- the seating support part is molded over the base part;
- the seating support part encapsulates an upper surface of the base part;
- the air passageway portion disposed through the base part includes a first segment with a first end disposed at an upper surface of the base part and a second end disposed in the interior of the base part, a second segment with a first end fluidly coupled with the second end of the first segment and a second end disposed proximate a center of the base, and a third segment with a first end fluidly coupled with the second end of the second segment and a second end fluidly coupled to the air mover;
- the first segment of the air passageway portion disposed through the base part, the air passageway portion disposed through the barrier and defined by the permeable portion of the barrier, and the air passageway portion disposed through the second foam part define a substantially straight column;
- the permeable portion of the barrier includes a hole;
- the barrier includes one or more of a film or a cloth and an adhesive is disposed between the base part and the barrier; and
- the base part includes an expanded polypropylene (EPP) foam, and the seating support part includes a polyurethane (PU) foam.

According to a second aspect of the present disclosure, a cushion assembly for a vehicle seating assembly includes a base part, a seating support part, a film disposed between the base part and the seating support part, and an air passageway extending from an upper surface of the base part to an air mover disposed proximate a lower surface of the seating support part. The air passageway inclues an air passageway portion molded into the base part, a permeable portion disposed in the film, and an air passageway portion molded into the seating support part.

Embodiments of the second aspect of the disclosure can include any one or a combination of the following features:
- the air passageway includes a plurality of concentrically arranged air passageways extending from an upper surface of the base part to the air mover disposed proximate a lower surface of the seating support part;
- the base part includes a foam and the seating support part includes a foam; and
- the air passageway portion molded into the base part includes a first segment positioned transverse to an upper surface of the base part and extending into the base part, a second segment fluidly coupled to the first segment and extending in a direction along the upper surface of the base part and toward a central portion of the base part, and a third segment transverse to and fluidly coupled to a second segment and extending toward the air mover disposed at the lower surface of the seating support part.

According to a third aspect of the present disclosure, a method for making a cushion assembly includes the steps of placing a barrier having a non-permeable portion and one or more permeable portions over the base part such that the one or more permeable portions are disposed over one or more air passageway portions in the base part, placing the base part and the barrier in a first mold tool part of the mold tool, closing the mold tool so that the first mold tool part and a second mold tool part form a mold tool cavity and such that one or more pegs extending from the second mold tool part protrude into the one or more permeable portions of the barrier and the one or more air passageway portions in the base part, and injecting a foam into the mold tool cavity to mold a seating support part including one or more air passageway portions around the barrier and the base part.

Embodiments of the third aspect of the disclosure can include any one or a combination of the following features:
- the first mold tool part includes an upper mold tool, and the second mold tool part includes a lower mold tool, and wherein the barrier includes a film.

These and other aspects, objects, and features of the present disclosure will be understood and appreciated by those skilled in the art upon studying the following specification, claims, and appended drawings.

DETAILED DESCRIPTION

Figure 1:
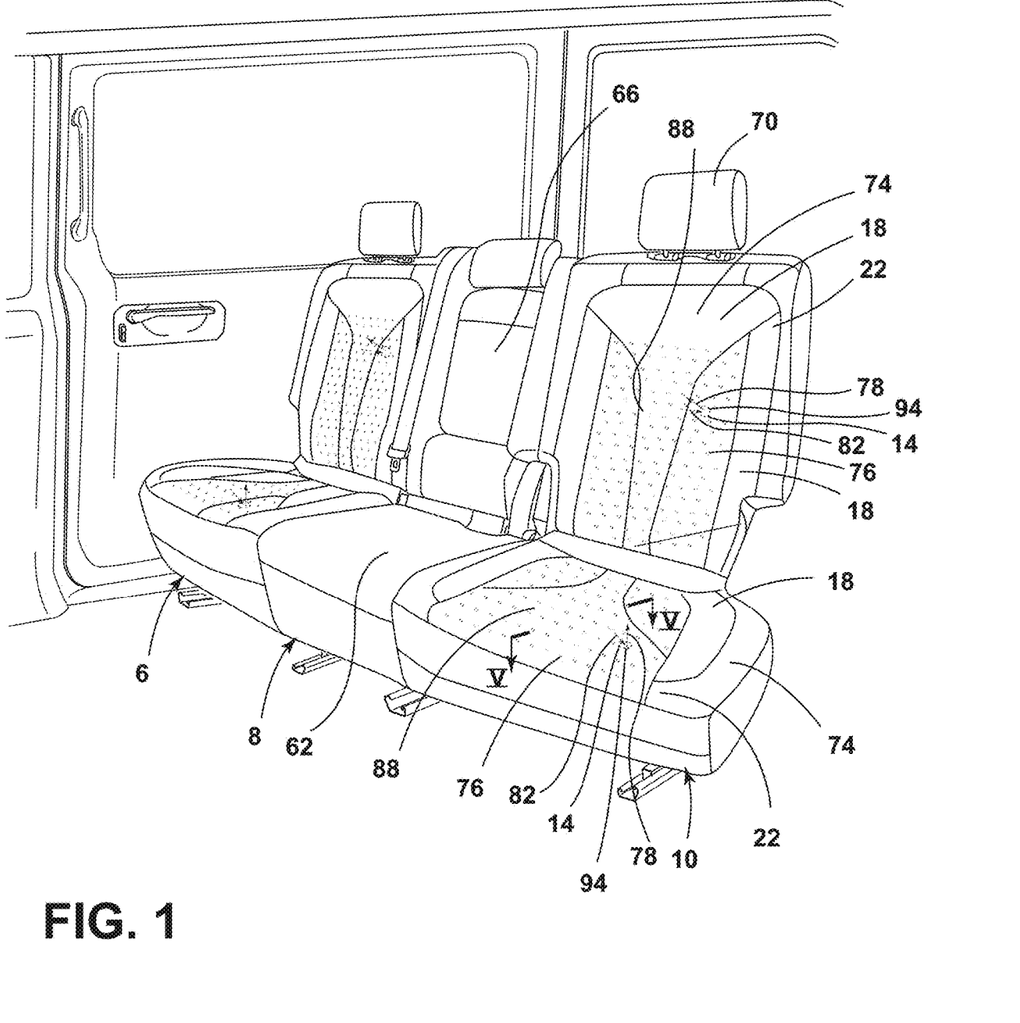
FIG. 1 is a side perspective view of a seating assembly in a vehicle interior.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As required, detailed aspects of the present disclosure are disclosed herein; however, it is to be understood that the disclosed aspects are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

With reference to the seating assembly 2 described below and shown in the attached figures, a seating assembly 2 may be described from the vantage point of a passenger seated in the seating assembly 2. The side of a seating assembly 2 disposed on a right side of a seated passenger may be referred to as a right side of the seating assembly 2. The side of a seating assembly 2 disposed on a left side of a seated passenger may be referred to as a left side of the seating assembly 2.

Referring to FIGS. 1-7, a vehicle seating assembly 2 includes a first part (for example, base part 26), a second part including a second foam part (for example, seating support part 38), a barrier 30 (for example, a film or a fabric) including a permeable portion 34 and a non-permeable portion 42, and an air passageway 14. The air passageway 14 extends through the first part (for example, base part 26), the second foam part (for example, seating support part 38), and the permeable portion 34 of the barrier 30. The air mover 46 is fluidly coupled to the air passageway 14 and moves air through the air passageway 14.

Figure 2:
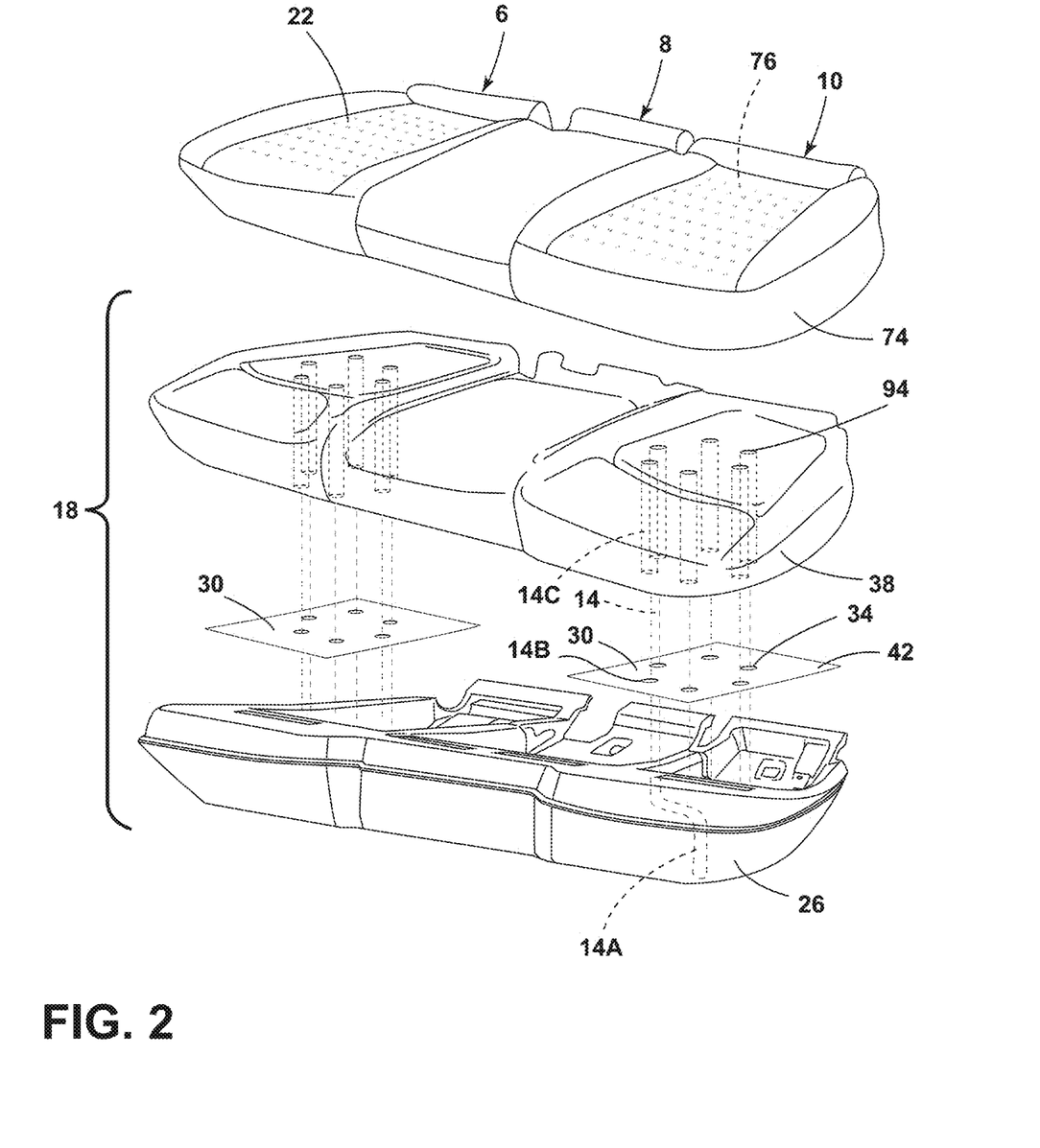
FIG. 2 is an exploded view of a cushion assembly of a seating assembly.

With reference to FIG. 1, a vehicle seating assembly 2 may include three seating spaces 6, 8, and 10 for passengers. The three seating spaces 6, 8, and 10 may include the right seating space 6, the middle seating space 8, and the left seating space 10. The vehicle seating assembly 2 may include a seat 62 and a seatback 66. A headrest 70 may be slidably coupled to the seatback 66. The seat 62 may include a cushion assembly 18. The seatback 66 may include a cushion assembly 18 that is specific to the construction requirements for the seatback 66 and that may be substantially similar to that of cushion assembly 18 for seat 62. With reference to FIG. 2, a cushion assembly 18 may include a base part 26, a barrier 30, a seating support part 38, and an air passageway 14 extending through the seating support part 38, the barrier 30, and the base part 26.

Referring again to FIG. 1, airflows 78 and 82 may leave or enter a seating surface 22, respectively, to provide a cooling effect to a passenger seated in the seating assembly 2 by directing air toward the passenger or pulling air away from the passenger. The airflows 78 and 82 leaving or entering the seating surface 22, respectively, may include ambient air or conditioned air. The conditioned air may include cooled air or heated air. The air mover 46 may be used to draw air from the seating surface 22, as shown by airflows 82, or may be used to push air to the seating surface, as shown by airflows 78, to provide a cooling effect to a passenger seated in the seating assembly 2.

With reference to FIGS. 1-2, a trim cover 74 including perforations 76 may be disposed on the seat 62 and the seatback 66. The airflows 78 and 82 may leave and enter, respectively, an air passageway 14 extending into the seat 62 and the seatback 66. The air passageway 14 may extend through the cushion assembly 18. The air passageway 14 may include an air passageway portion 14A extending through the base part 26, an air passageway portion 14B extending thought the barrier 30, and an air passageway portion 14C extending thorough the seating support part 38. The perforated trim cover 74 may include a pattern of perforations 76. The pattern of perforations 76 may enable airflow distribution to the occupant and reduction of craftsmanship issues such as wrinkles or read-thru of underlying geometries. The geometric designs of the air passageway portion 14A in the base part 26, air passageway portion 14B in the barrier 30, and air passageway portion 14C in the seating support part 38 may vary depending on the airflow properties required for occupant cooling (i.e., more holes for larger air flow motors, fewer holes for smaller air flow motors, etc.).

With reference to FIGS. 2-5, air passageways 14 may extend through the cushion assembly 18 at the right seating space 6 and the left seating space 10. An exploded view of a cushion assembly 18 is shown in FIG. 2. The base part 26 may include an Expanded Poly Propylene (EPP) foam. The seating support part 38 may include a Polyurethane (PU) foam. In various examples, the base part 26 may include materials other than a PU foam. For example, the base part 26 may include a molded plastic, a polystyrene, and/or other polymer substrate that may withstand a molding process within the PU foam. The seating support part 38 may be disposed on the upper surface 98 of the base part 26. Each barrier 30 may include a non-permeable portion 42 and a permeable portion 34. The permeable portion 34 may define an air passageway portion 14B.

Figure 3A:
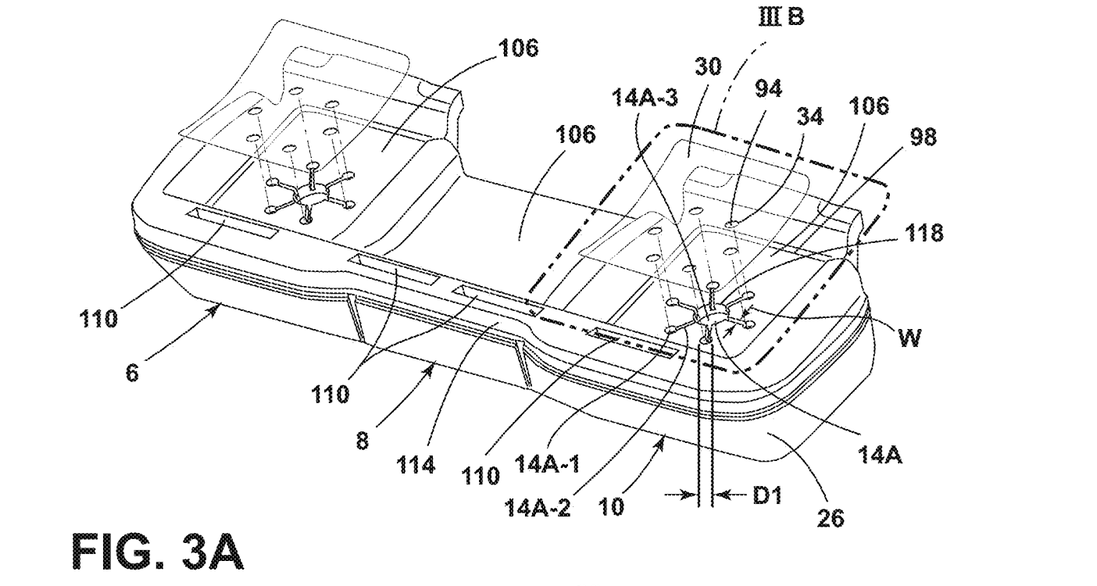
FIG. 3A is a top perspective view of a base part of a seating assembly and barriers.
Figure 3B:
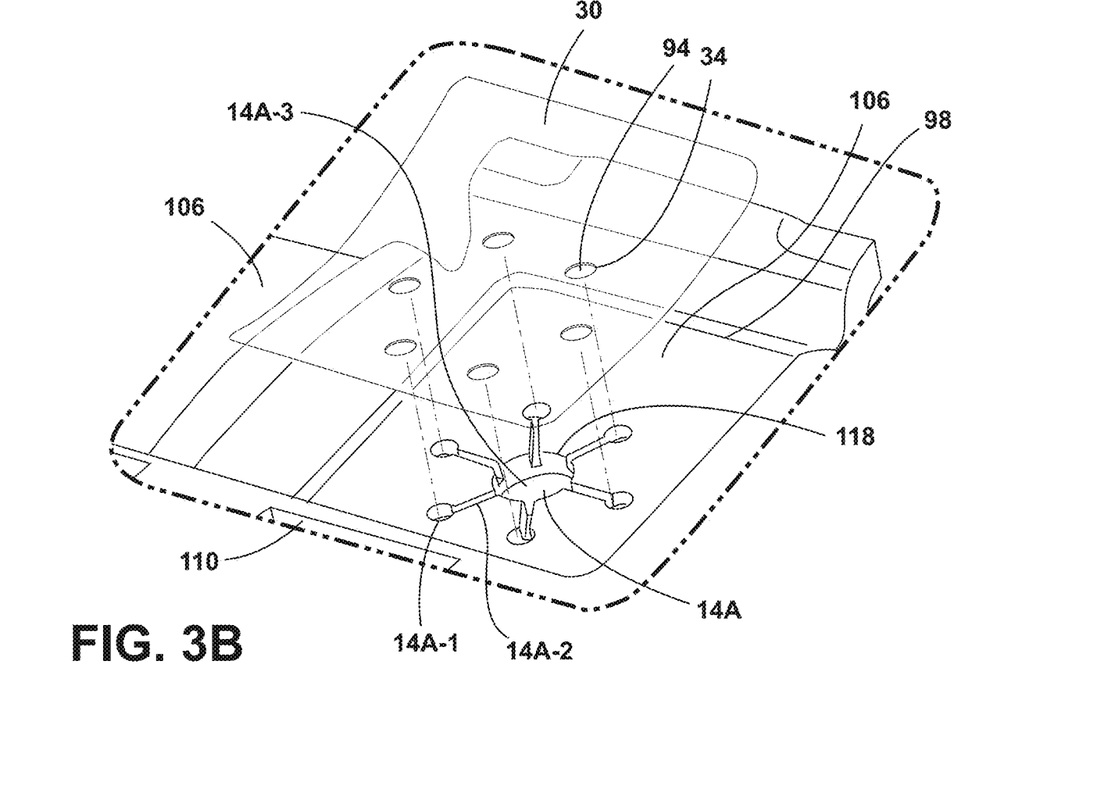
FIG. 3B is a top perspective view of a portion of the base part of the seating assembly and a barrier of FIG. 3A.
Figure 4:
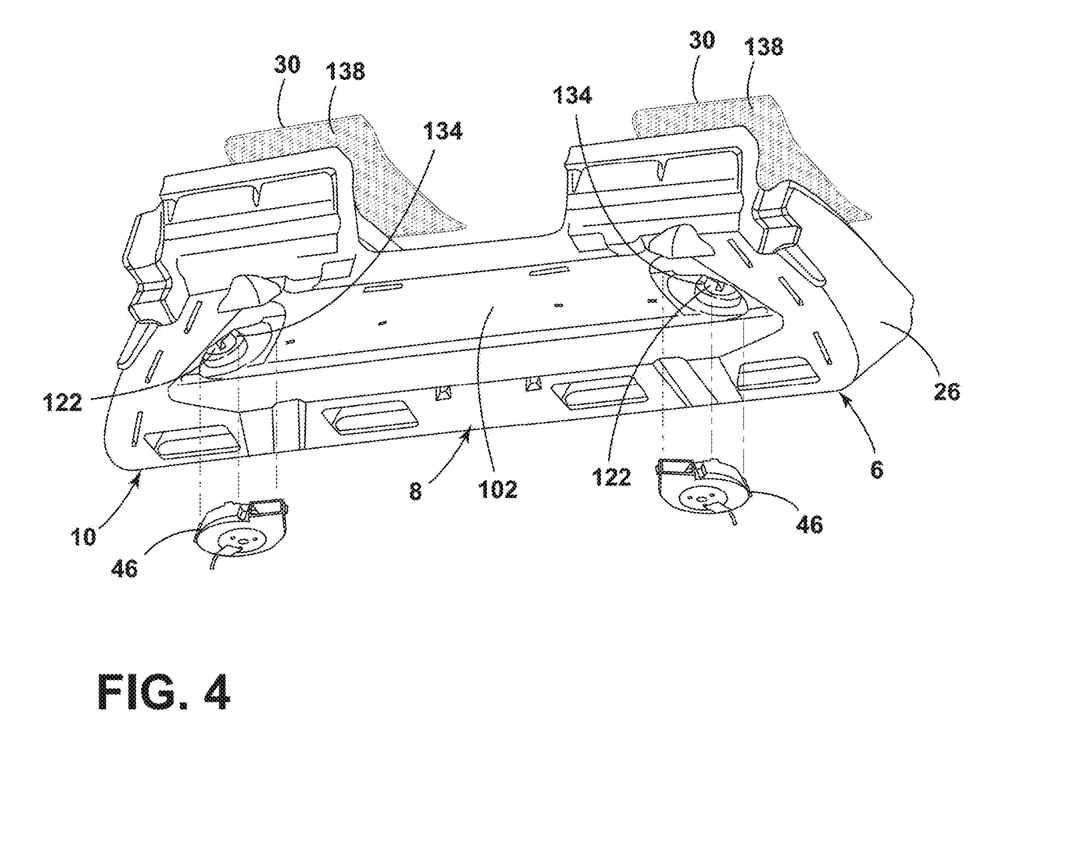
FIG. 4 is a bottom perspective view of a base part of a seating assembly, air movers, and barriers.

Referring now to FIGS. 2-4, the base part 26 of a cushion assembly 18 with barriers 30 for directing airflows 78, 82 is shown. The base part 26 may include contours for housing components that may be coupled to the base part 26. The components may include the seating support part 38, the barriers 30, the air movers 46, and other components. The base part 26 may include an upper surface 98 and a lower surface 102. The upper surface 98 may include three depressions 106 that may correspond to three passenger seating spaces 6, 8, 10. The upper surface 98 may also include retention features 110 disposed along a longitudinal edge 114 of the base part 26. The retention features 110 may be shaped to receive the PU foam or other material that may make up the seating support part 38. The PU foam or other material that may make up the seating support part 38 may extend into the retention features 110 to form an interference fit between the base part 26 and the seating support part 38. An air passageway 14A may extend through the base part 26. The base part 26 may include a base distribution system 118. In various examples, the base distribution system 118 may include one or more air passageway portions 14A. In the example shown, each air passageway portion 14A may include a first segment 14A-1, a second segment 14A-2, and a third segment 14A-3. The first segment 14A-1 may be a round channel that may extend downward from the upper surface 98 of the base part 26 and into the base part 26. The second segment 14A-2 may include a trench that is disposed along the upper surface 98 of the base part 26. The second segment 14A-2 may extend inward from the first segment 14A-1 to a third segment 14A-3 that may extend downward toward the lower surface 102 of the base part 26. An air mover 46 may be disposed in the third segment 14A-3 or proximate the lower surface 102 of the base part 26.

With continued reference to FIGS. 2-4, the first segment 14A-1 may include a diameter D1 that may be greater than the width W of the second segment 14A-2 of the air passageway portion 14A of the base part 26. In the example shown, the first segments 14A-1 may be in a circular arrangement. The third segment 14A-3 may be disposed in the middle of the circular arrangement of the first segment 14A-1.

Referring to FIGS. 2-5, the barriers 30 for directing airflows 78, 82 may each include a non-permeable portion 42 and at least one permeable portion 34. In the example shown, each of the barriers 30 may include a film having at least one permeable portion 34 that may define an air passageway portion 14B that may extend through the barrier 30.

With reference to FIGS. 2-4, in some examples of the disclosure, the air passageway portion 14C that extends through the seating support part 38, the air passageway portion 14B that extends through the permeable portion 34 of the barrier 30, and the air passageway portion 14A that extends through the base 26 may be arranged in various orientations, directions, and shapes (for example, curved, diagonal, substantially horizontal, etc.) that may form an air passageway 14 through the seating support part 38, the permeable portion 34 of the barrier 30, and the base part 26. In some examples of the disclosure, air passageway portion 14A and air passageway portion 14C may include a porous foam.

Referring to FIGS. 2-4, the barrier 30 may include a film having a plurality of permeable portions 34 disposed in a substantially circular arrangement that may correspond to the air passageway portion 14C in the seating support part 38 and the air passageway portion 14A in the base part 26. In one example, the permeable portions 34 in the barrier 30 may be holes 94. In another example, the barrier 30 may include a fabric. The fabric may include a cloth. The cloth may include permeable portions 34 that may be formed as holes 94 for allowing airflows 82, 78 through the cloth. The barrier 30 may include an adhesive 138. The adhesive 138 may be disposed on the bottom side of the barrier 30 so that the barrier 30 may be secured to the base part 26. It may be desirable to secure the barrier 30 to the base part 26 while the seating support part 38 is molded or otherwise formed over the base part 26. The design of the air passageway portion 14C in the seating support part 38 may include parameters that provide for efficient airflows 78, 82 (for example, optimization of velocity of airflow, turbulence of airflow, heat of airflow, sound of airflow, etc.). The airflows 82 may travel from the seating surface 22 and through the seating support part 38 air passageway portions 14C to enter the first segment 14A-1 of the air passageway portion 14A disposed in the base part 26, and the airflows 82 may be pulled towards the air mover 46 through the first segments 14A-1 and the second segments 14A-2 of the air passageway portion 14A. The barrier 30 may protect the second segments 14A-2 of the air passageway portion 14A and the third segments 14A-3 of the air passageway portion 14A during the molding process. The barrier 30 may act as a wall to prevent material from the seating support part 38 from entering the second segments 14A-2 of the air passageway portion 14A and the third segments 14A-3 of the air passageway portion 14A of the base part 26 as the seating support part 38 is over molded onto the base part 26. During the foam pouring manufacturing process for cushion assembly 18 (FIG. 2), the barrier 30 may act as a wall to minimize foam material from seating support part 38 (FIG. 1) from entering the airflow passageways 14A of the base part 26 during over molding of seating support part 38 (FIG. 1) on to the base part 26.

Figure 5:
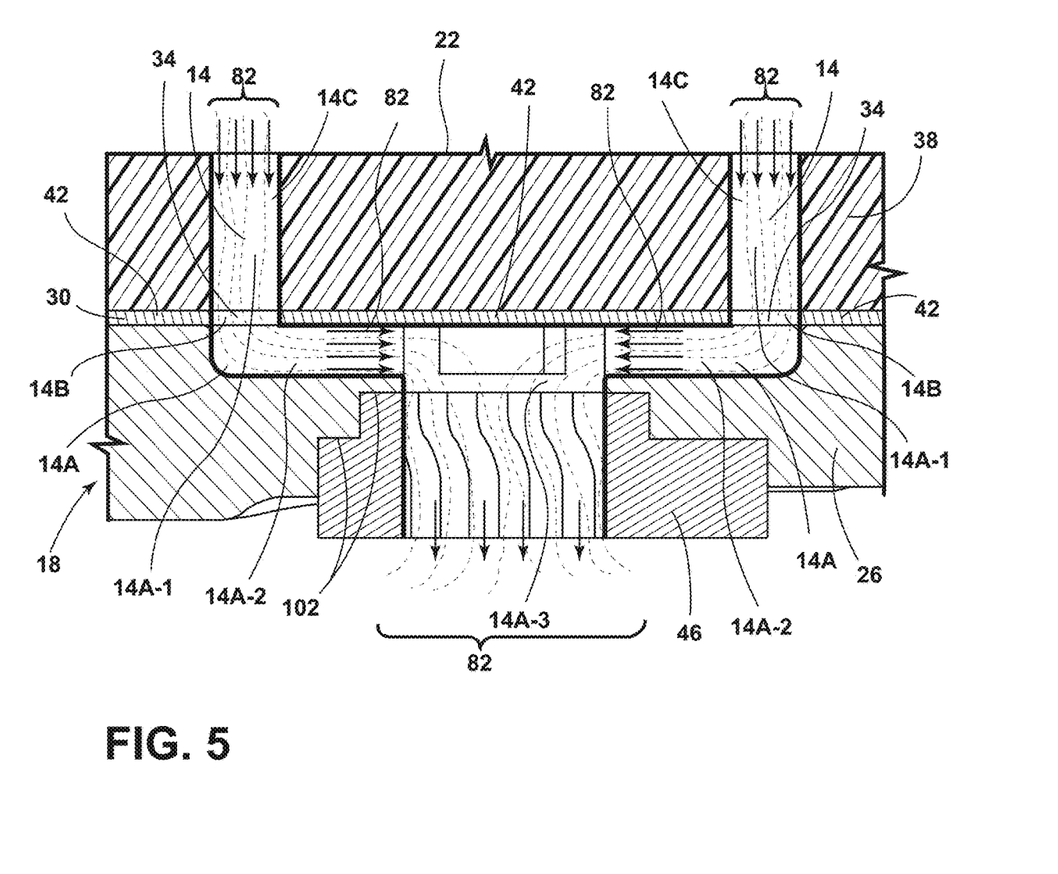
FIG. 5 is a cross-sectional view taken along line V-V of FIG. 1 of a cushion assembly.

Referring to FIGS. 4-5, the air movers 46 are shown disposed below the base part 26. The base part 26 may include spaces 134 designed to receive the air movers 46. An air mover 46 may be disposed at the bottom of the third segment 14A-3 of the air passageway portion 14A of the base part 26. As such, the air mover 46 may deliver an airflow 82 into and an airflow 78 out of the third segment 14A-3 to deliver, respectively, air to the seating surface 22 (airflows 78) and to draw air into the seating surface 22 (airflows 82).

Referring now to FIG. 5, a cross-sectional schematic view of an air passageway 14 disposed in a cushion assembly 18 is shown. An air mover 46 may be disposed against a lower surface 102 of a base part 26. The seating support part 38 may be disposed above the base part 26. A barrier 30 may be disposed between the base part 26 and the seating support part 38. Airflows 82 may enter the air passageway portions 14C in the seating support part 38. An air passageway 14 may extend through the seating support part 38, the barrier 30, and the base part 26. The barrier 30 may include permeable portions 34 that may be disposed between the air passageway portions 14C in the seating support part 38 and the air passageway portion 14A in the base part 26. The second segments 14A-2 of the air passageway portions 14A in the base part 26 are shown extending between the first segments 14A-1 and the third segments 14A-3 of the air passageway portions 14A of the base part 26. The airflows 82 are shown traveling through the first segments 14A-1 of the air passageway portions 14A of the seating support part 38, the second segments 14A-2 of the air passageway portion 14A of the base part 26, the third segments 14A-3 of the air passageway portion 14A of the base part 26 and out of the air mover 46. The airflows 82 may be expelled from the air mover 46 in an area beneath or behind a cushion assembly 18. It is to be understood that the air may also be pushed out of the air mover 46 and to the seating surface 22 (airflows 78 in FIG. 1) in another example of the disclosure.

Figure 6A:
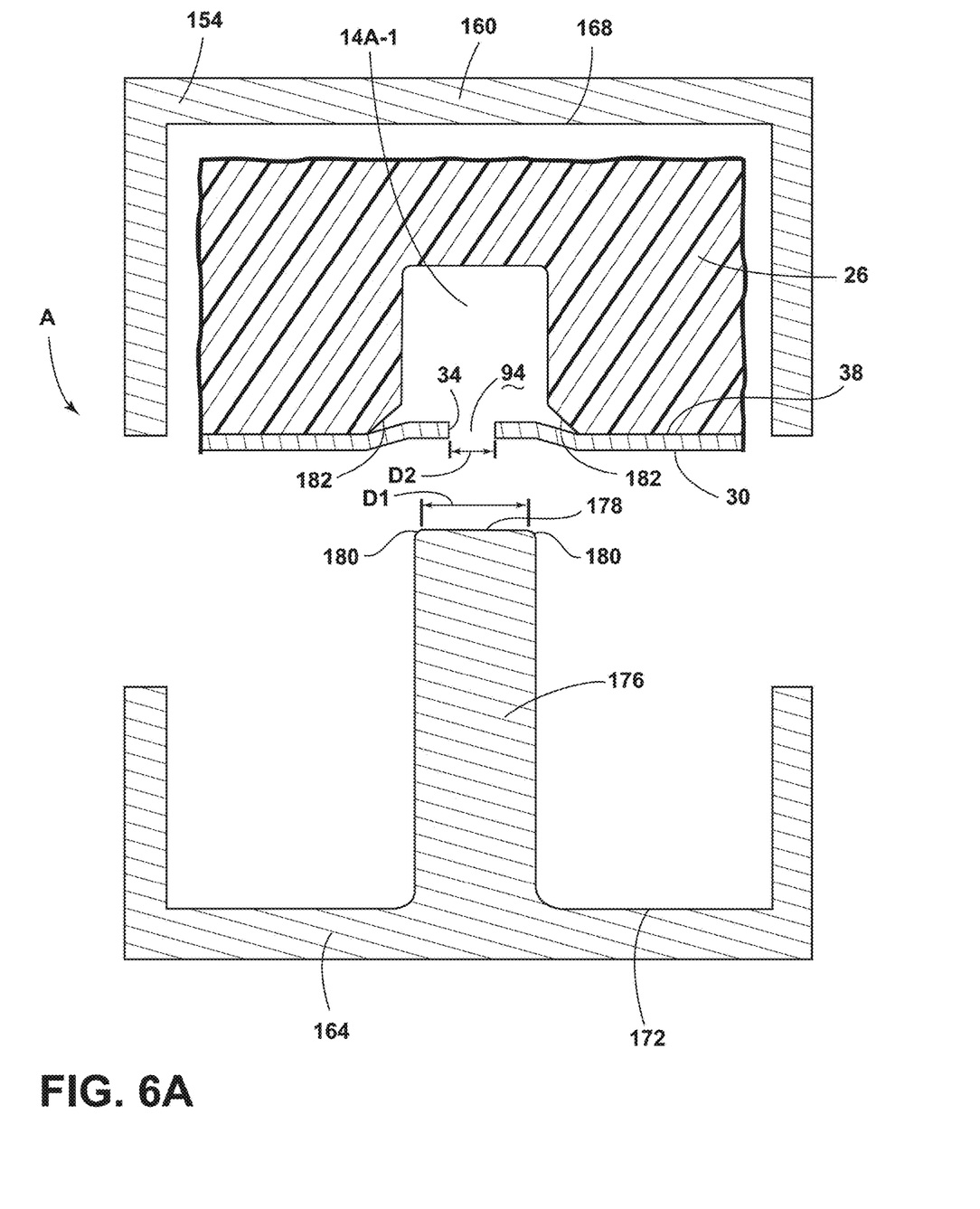
FIG. 6A is a schematic cross-sectional view of an exemplary portion of a base part and a barrier in an upper mold tool part with the mold tool in the open position.

Referring to FIGS. 6A-6D, exemplary steps of molding an exemplary portion of a cushion assembly 18 are shown. FIGS. 6A-6D show exemplary steps for molding a cushion assembly 18 portion that includes a first segment 14A-1 of the air passageway portion 14A in the base part 26, an air passageway portion 14B through the barrier 30, and an air passageway portion 14C through the seating support part 38. With reference to FIG. 6A, a cross-sectional view is shown of a mold tool 154 in an open position A. The mold tool 154 may include an upper mold tool part 160 and a lower mold tool part 164. The upper mold tool part 160 may include an upper mating surface 168. The lower mold tool part 164 may include a lower mating surface 172. The lower mold tool part 164 may include a peg 176 that may extend from the lower mating surface 172 toward the upper mating surface 168. The peg 176 may be designed to form part of the air passageway 14A during the molding process.

With continued reference to FIGS. 6A-6D, in the example shown, a portion of a base part 26 made of EPP foam is disposed in the upper mating surface 168. A barrier 30 may cover the second segments 14A-2 of the air passageway portion 14A disposed in the base part 26 and the third segment 14A-3 of the air passageway portion 14A disposed in the base part 26. The barrier 30 may be placed over the second segments 14A-2 of the air passageway portion 14A of the base part 26 and the third segment 14A-3 of the air passageway portion 14A of the base part 26 so that the barrier 30 may separate the PU foam that may be molded as the seating support part 38 from the EPP foam that may form the base part 26. Additionally, the barrier 30 may keep debris and flash from the molding process of the PU foam of the seating support part 38 out of the second segments 14A-2 of the air passageway portion 14A of the base part 26 and the third segment 14A-3 of the air passageway portion 14A of the base part 26.

With continued reference to FIGS. 6A-6D, in some examples the base part 26 may include a preformed chamfer that may be disposed around the hole 94. Alternatively, the preformed chamfer may include a reinforced portion of the barrier 30 that may be disposed above the peg 176 and may be used to assist mitigation of the foam flowing into the mold tool cavity 150 for the peg 176.

Figure 6B:
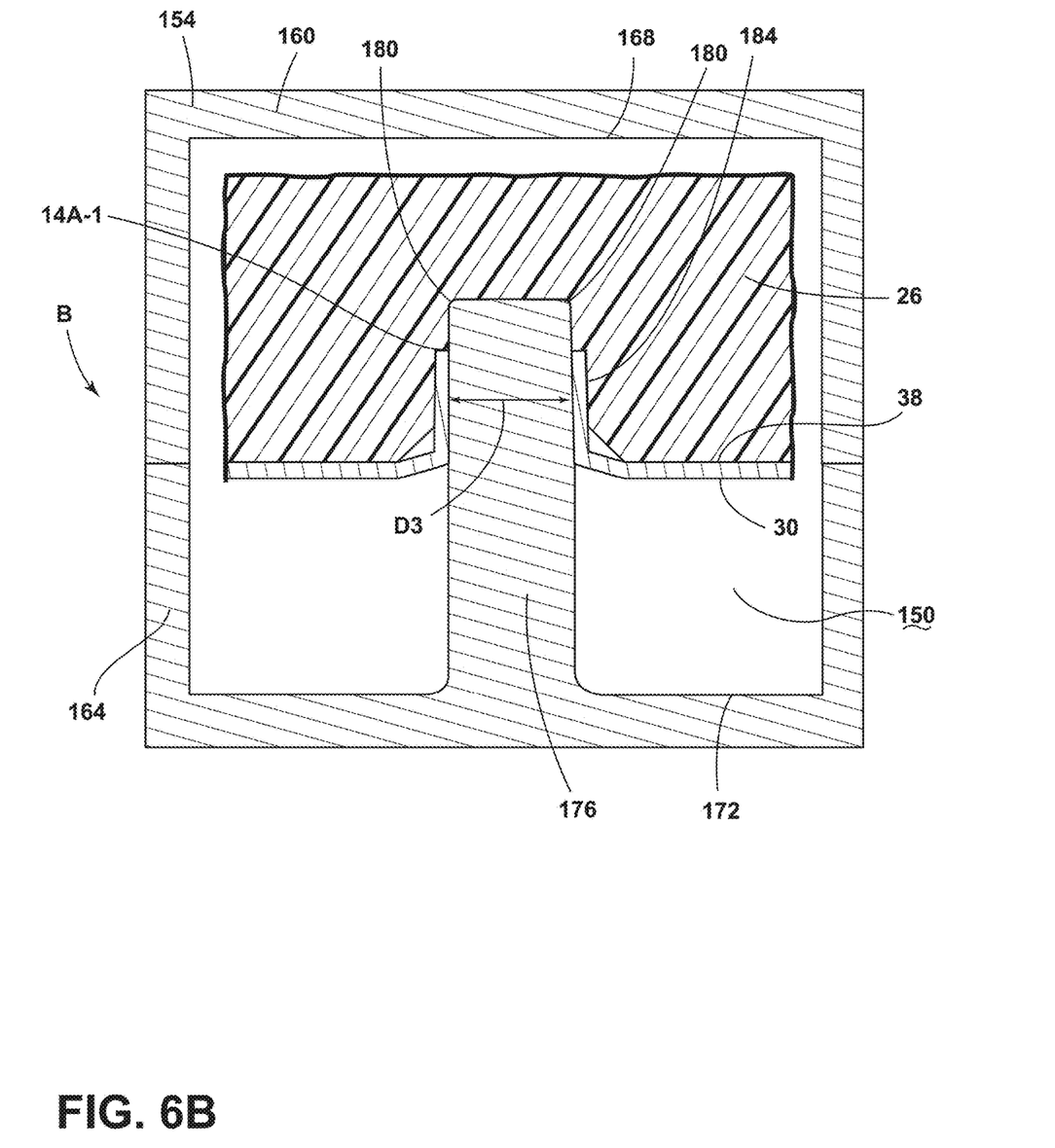
FIG. 6B is a schematic cross-sectional view of an exemplary portion of a base part and a barrier in an upper mold tool part with the mold tool in the closed position prior to foam expansion within the tool enclosure.
Figure 6C:
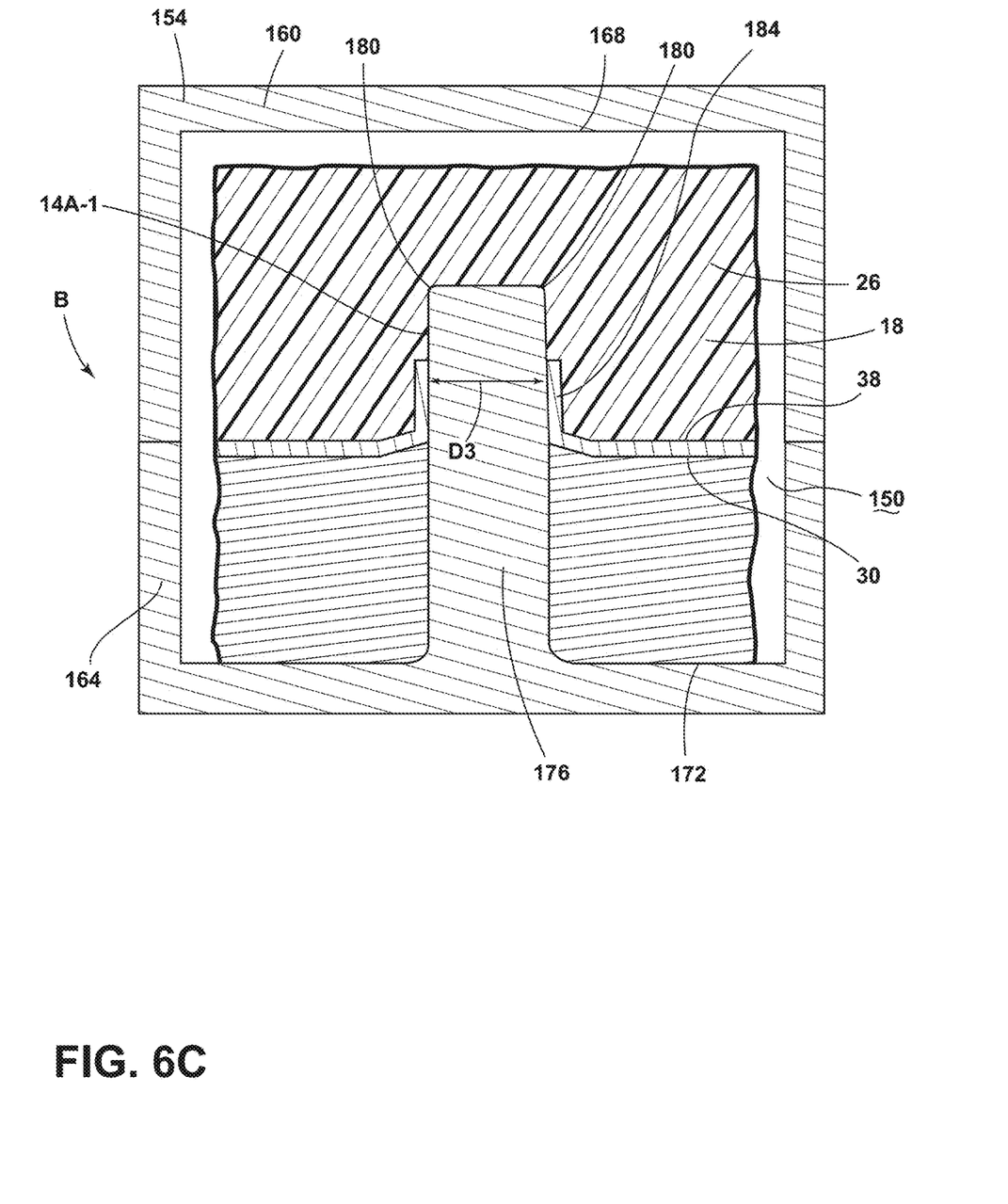
FIG. 6C is a schematic cross-sectional view of an exemplary portion of a base part, a barrier in an upper mold tool part, and the seating part with the mold tool in the closed position following foam expansion within the tool enclosure.

Referring now to FIGS. 6B-6C, the mold tool 154 is shown in the closed position B. The upper mold tool part 160 and the lower mold tool part 164 in the closed position B form a mold tool cavity 150. With reference to FIG. 6B, the mold tool 154 is shown prior to the injection of the PU foam that forms the seating support part 38 into the mold tool cavity 150. The chamfer 180 disposed around the top surface 178 of the peg 176, the barrier 30, and the chamfer 182 disposed in the base part 26 may form a seal 184 when the mold tool 154 is in the closed position B. The chamfer designed into the base part allows for peg insertion through the barrier in order to allow the hole in the barrier to fully elongated and form to the peg walls to create a seal. The seal 184 may minimize entry of PU foam used for the seating support part 38 into the area adjacent to the peg 176. The seal 184 may maintain the PU foam used for the seating support part 38 primarily outside of the first segment 14A-1 of the air passageway portion 14A in the base part 26. During the PU foam over molding process for molding the seating support part 38 over the base part 26 and the barrier 30, the PU foam may expand. The barrier 30 may substantially prevent the expanding PU foam from entering the second segments 14A-2 of the air passageway portion 14A of the base part 26 and the third segment 14A-3 of the air passageway portion 14A of the base part 26. Additionally, the barrier 30 may be generally structurally strong so as to minimize likelihood of depression of the barrier 30 into the first segments 14A-1 and the second segments 14A-2 of the air passageway portion 14A in the base part 26 and the third segments 14A-3 of the air passageway portion 14A of the base part 26 due to possible expansion of the PU foam of the seating support part 38 during the over molding process. The material of the barrier 30 adjacent to the holes 94 may be designed to stretch and/or elongate when the pegs 176 extend into the holes 94 as the mold tool 154 is moved from the open position A to the closed position B. The barrier 30 may stretch due to the smaller diameter D2 of the hole 94 being expanded by the larger diameter D1 of the peg 176 upon mold tool 154 closure and the chamfer 180. By allowing portions of the barrier 30 proximate the holes 94 to stretch within the first segment 14A-1 of the air passageway portion 14A, a seal 184 may be created between the peg 176 and the barrier 30. The seal 184 may allow for a first segment 14A-1 of the air passageway portion 14A to form a part of the air passageway 14 through the base part 26, the barrier 30, and the seating support part 38 following withdrawal of the peg 176 from the cushion assembly 18 upon conclusion of the molding process. The hole 94 in the barrier 30 may have a diameter D2 that may be less than the diameter D3 of the peg 176.

Figure 6D:
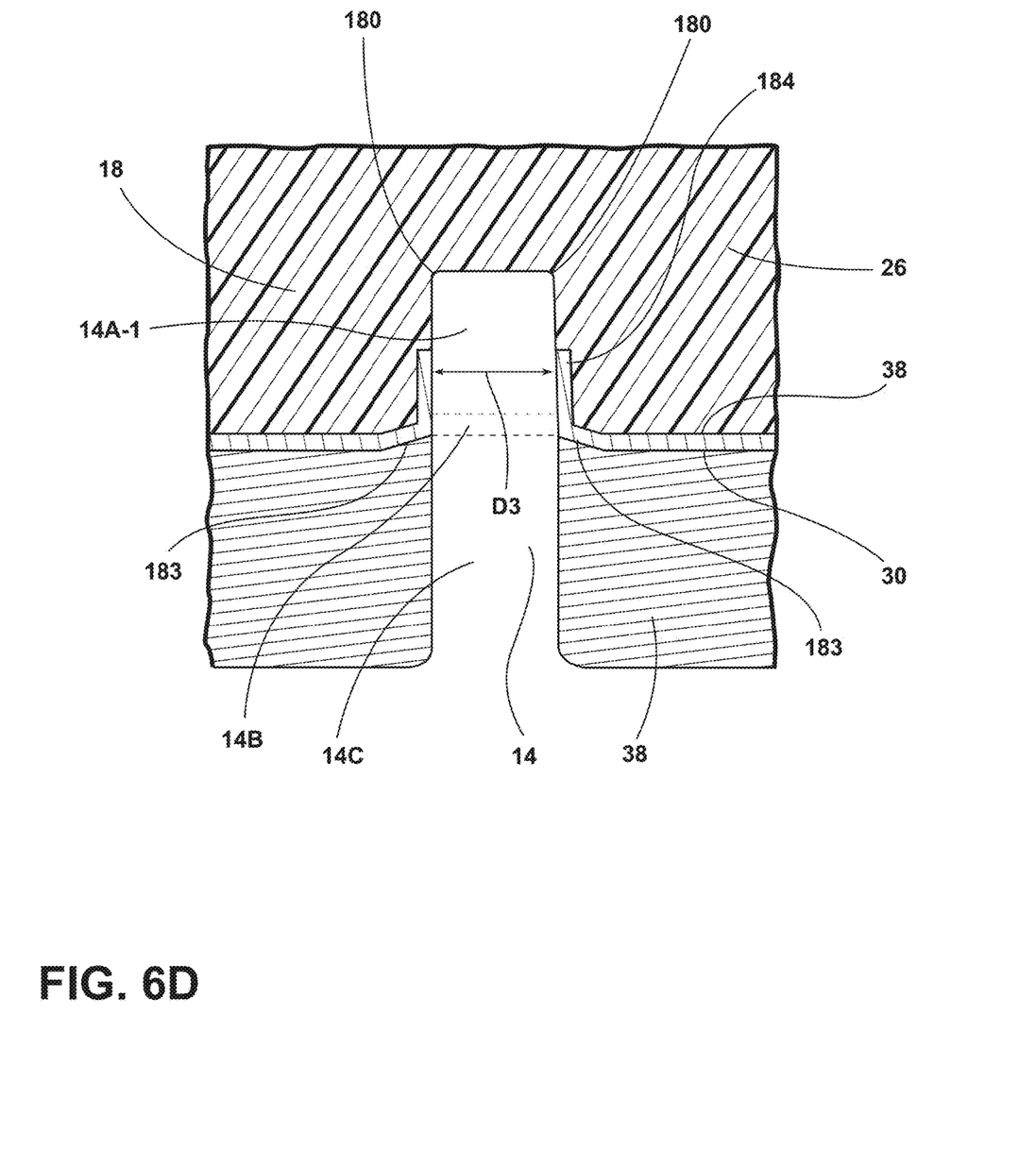
FIG. 6D is a schematic cross-sectional view of an exemplary portion of a cushion assembly removed from the mold tool.

Referring to FIG. 6D, a portion of the cushion assembly 18 is shown after removal from the mold tool 154. It is to be understood that FIGS. 6A-6D show molding of a portion of the cushion assembly 18 that is disposed around an air passageway 14 that includes the first segment 14A-1 of the air passageway portion 14A in the base part 26, the air passageway portion 14B in the barrier 30, and the air passageway portion 14A in the seating support part 38. As such, FIGS. 6A-6D show the process for molding a portion of the air passageway 14 of a cushion assembly 18.

Figure 7:
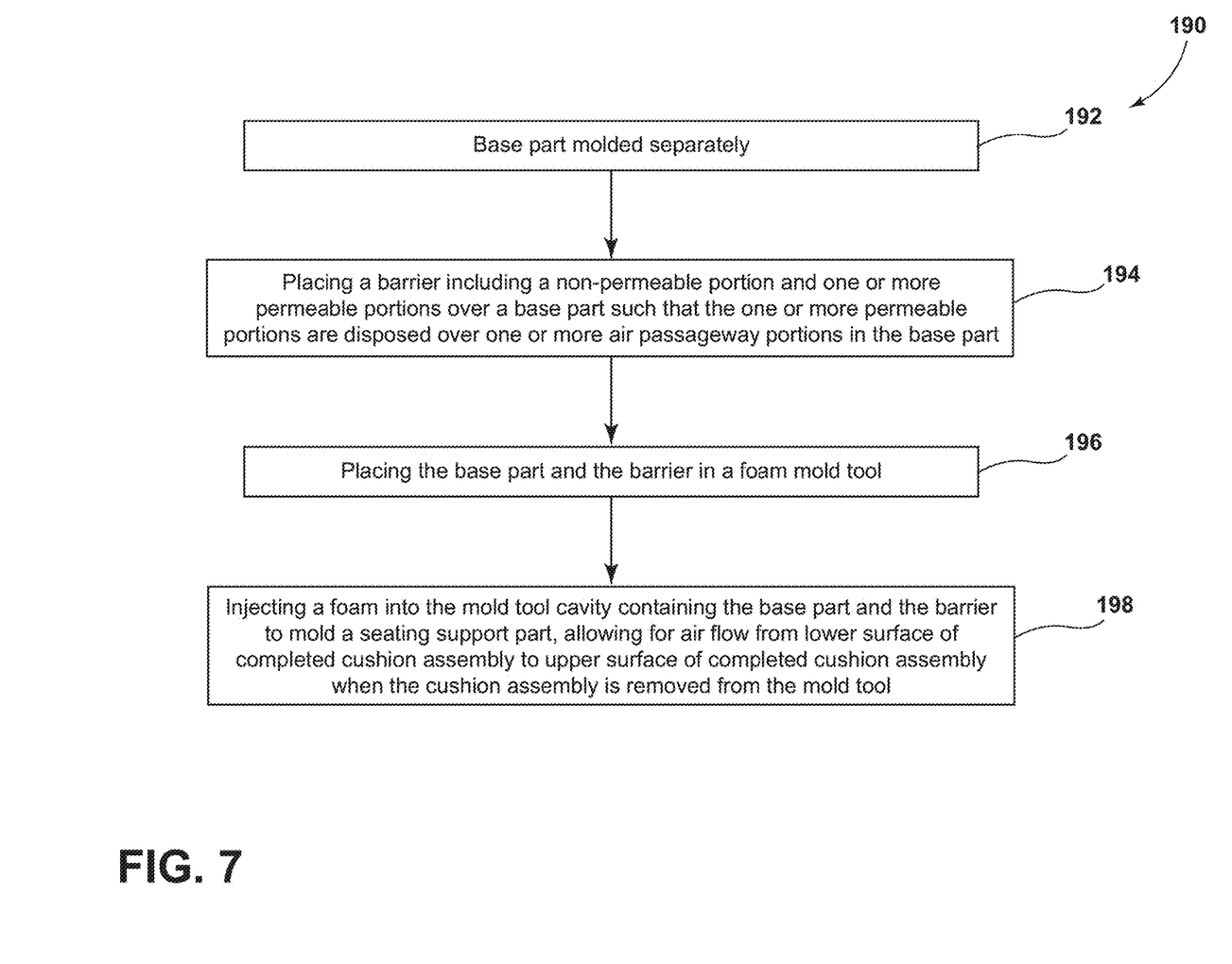
FIG. 7 is a flow diagram of a method for making a cushion assembly according to an example of the present disclosure.

With reference to FIG. 7, a method 190 for making a cushion assembly 18 may include various steps. Step 192 includes providing a base part 26 molded separately. Step 194 includes placing a barrier 30, including a non-permeable portion 42 and one or more permeable portions 34, over a base part 26 such that the one or more permeable portions 34 are disposed over one or more air passageway portions 14A in the base part 26. Step 196 includes the step of placing the base part 26 and the barrier 30 in a foam mold tool 154. Step 198 includes the step of injecting a foam into the mold tool cavity 150 containing the base part 26 and the barrier 30 to mold a (unified) seating support part 38, allowing for airflow 78 from a lower surface 102 of the completed cushion assembly 18 to a seating surface 22 of the completed cushion assembly 18.

A variety of advantages may be obtained by use of the present disclosure. An air passageway 14, an air mover 46, and a barrier 30 may be integrated into a seating assembly 2 including a base part 26 and an over molded seating support part 38. A manufacturing process for making cushion assemblies 18 may include molding a seating support part 38 around a base part 26 and a barrier 30 for directing ventilation. Use of EPP foam in a cushion assembly 18 may provide noise reduction. Use of an over molding process and a barrier 30 that may withstand molding temperatures may increase efficiency of the cushion assembly manufacturing process.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a first part, wherein the first part includes a base part;
   a second part including a second foam part, wherein the second foam part includes a seating support part;
   a barrier including:
      a permeable portion and a non-permeable portion;
   an air passageway extending through the first part, the second foam part, and the permeable portion of the barrier; and
   an air mover fluidly coupled to the air passageway for moving air through the air passageway, wherein the air passageway includes:
      an air passageway portion disposed through the first part;
      an air passageway portion disposed through the barrier and defined by the permeable portion of the barrier; and
      an air passageway portion disposed through the second foam part, wherein the air passageway portion disposed through the base part includes a first segment including a first end disposed at an upper surface of the base part and a second end disposed in the interior of the base part, a second segment including a first end fluidly coupled with the second end of the first segment and a second end disposed proximate a center of the base, and a third segment including a first end fluidly coupled with the second end of the second segment and a second end fluidly coupled to the air mover.

2. The vehicle seating assembly of claim 1, wherein the first part includes a first foam part.

3. The vehicle seating assembly of claim 1, wherein the first part includes one or more of: a molded plastic, an expanded polypropylene (EPP), and a polystyrene.

4. The vehicle seating assembly of claim 1, wherein the barrier includes a film including a permeable portion and a non-permeable portion.

5. The vehicle seating assembly of claim 4, wherein the seating support part is molded over the base part.

6. The vehicle seating assembly of claim 5, wherein the seating support part encapsulates an upper surface of the base part.

7. The vehicle seating assembly of claim 1, wherein the barrier includes a non-woven cloth including a permeable portion and a non-permeable portion.

8. The vehicle seating assembly of claim 1, wherein the first segment of the air passageway portion disposed through the base part, the air passageway portion disposed through the barrier and defined by the permeable portion of the barrier, and the air passageway portion disposed through the second foam part define a substantially straight column.

9. The vehicle seating assembly of claim 8, wherein the permeable portion of the barrier includes a hole.

10. The vehicle seating assembly of claim 9, wherein the barrier includes one or more of a film or a cloth and wherein an adhesive is disposed between the base part and the barrier.

11. The vehicle seating assembly of claim 10, wherein the base part includes an expanded polypropylene (EPP) foam and the seating support part includes a polyurethane (PU) foam.

12. A cushion assembly for a vehicle seating assembly comprising:
    a base part;
    a seating support part;
    a film disposed between the base part and the seating support part; and
    an air passageway extending from an upper surface of the base part to an air mover disposed proximate a lower surface of the seating support part and including:
       an air passageway portion molded into the base part;
       a permeable portion disposed in the film; and
       an air passageway portion molded into the seating support part, wherein the air passageway portion molded into the base part includes a first segment positioned transverse to an upper surface of the base part and extending into the base part, a second segment fluidly coupled to the first segment and extending in a direction along the upper surface of the base part and toward a central portion of the base part, and a third segment transverse to and fluidly coupled to the second segment and extending toward the air mover disposed at the lower surface of the seating support part, wherein the base part includes a foam and the seating support part includes a foam, and wherein the air passageway includes a plurality of concentrically arranged air passageways extending from an upper surface of the base part to the air mover disposed proximate a lower surface of the seating support part.

13. A method for making a cushion assembly comprising the steps of:
    placing a barrier including a non-permeable portion and one or more permeable portions over a base part such that the one or more permeable portions are disposed over one or more air passageway portions in the base part;
    placing the base part and the barrier in a first mold tool part of a mold tool;
    closing the mold tool so that the first mold tool part and a second mold tool part form a mold tool cavity and such that one or more pegs extending from the second mold tool part protrude into the one or more permeable portions of the barrier and the one or more air passageway portions in the base part; and
    injecting a foam into the mold tool cavity to mold a seating support part including one or more air passageway portions around the barrier and the base part.

14. The method for making a cushion assembly of claim 13, wherein the first mold tool part includes an upper mold tool and wherein the second mold tool part includes a lower mold tool, and wherein the barrier includes a film.

* * * * *